United States Patent [19]

Coquard et al.

[11] Patent Number: 4,581,440

[45] Date of Patent: Apr. 8, 1986

[54] HOMOGENEOUS BLOCK COPOLYETHERAMIDES FLEXIBLE AT LOW TEMPERATURES

[75] Inventors: Jean Coquard, Grezieu la Varenne; Jean Goletto, Ecully, both of France

[73] Assignee: Rhone-Poulenc Specialities Chimiques, Courbevoie, France

[21] Appl. No.: 625,629

[22] Filed: Jun. 28, 1984

[30] Foreign Application Priority Data

Jun. 28, 1983 [FR] France .................. 83 10939

[51] Int. Cl.$^4$ ............................................. C08G 69/14
[52] U.S. Cl. ................................. 528/324; 528/313; 528/323
[58] Field of Search ................. 528/324, 323, 313

[56] References Cited

U.S. PATENT DOCUMENTS 4,356,300 10/1982 Isler et al. .................. 528/324

Primary Examiner—Harold D. Anderson

Attorney, Agent, or Firm—Burns, Doane, Swecker & Mathis

[57] ABSTRACT

Novel block copolyetheramides which are homogeneous and flexible at low temperatures and have melting or softening points of at least 170° C., glass transition temperatures of at most −5° C. and viscosities in the molten state of at least 500 poises, are facilely prepared by copolymerizing (I) admixture of a lactam having from 4 to 12 carbon atoms with a solution of a salt of a fatty acid dimer and a polyoxyalkylenediamine in a solvent medium comprising (i) a mixture of water and an aliphatic alcohol having less than 5 carbon atoms, (ii) a water/alcohol/lactam mixture, (iii) a lactam in molten state or (iv) a water/lactam mixture wherein the lactam is water soluble, the stoichiometry of said salt being adjusted such that the pH thereof is within ±0.05 pH units of its equivalence point and (II) a minor amount of a strong inorganic oxyacid or a strong organic oxyacid other than a carboxylic acid.

12 Claims, No Drawings

HOMOGENEOUS BLOCK COPOLYETHERAMIDES FLEXIBLE AT LOW TEMPERATURES

BACKGROUND OF THE INVENTION

1. Field of the Invention

The present invention relates to novel homogeneous copolyetheramide block polymers which have, in particular, a high crystallinity such as to provide high melting points and a good mechanical resistance to heat, the lowest possible glass transition temperature such as to provide substantial flexibility and elasticity at temperatures as low as $-20°$ C. or below, and a high viscosity in the molten state, which is compatible with ease of use in the fields of injection molding and extrusion.

2. Description of the Prior Art

U.S. Pat. No. 4,218,351 describes thermoplastic elastomers consisting of copolyetheramides. In this patent, a general family of copolyetheramides is proposed, the polymers being obtained by the direct reaction of three types of constituents, each possessing functional groups capable of participating in a reaction which produces amide groups. The first constituent (i) is selected from the group comprising a short-chain dicarboxylic acid, a short-chain diamine, a short-chain lactam, a short-chain aminoacid and a mixture of two or more than two of these species with one another; the second constituent (ii) is a fatty acid dimer or an amino derivative of a fatty acid dimer; and the third constituent (iii) is a polyoxyalkylenediamine or a polyoxyalkylenedicarboxylic acid. The constituents participating in the reaction are selected such as to introduce approximately equivalent quantities of $NH_2$ and COOH groups into the medium. From the examples in the aforesaid '351 patent, it is noted that the copolyetheramides which are in fact prepared are essentially obtained by reacting (i) a mixture of a short-chain diacid and a short-chain diamine, or a mixture of a lactam and a short-chain diacid or a short-chain diamine, with a reactant of type (ii) and a reactant of type (iii). The copolyetheramides prepared in this manner have valuable properties, in particular flexibility at low temperature, which is responsible for the good impact strength properties stated. However, their low viscosity in the molten state, which is generally less than 100 poises at 232° C., enables them to be used only as adhesives. Now, in the fields of molding and extrusion of plastics, materials are required which have a sufficiently high viscosity in the molten state as to permit them to be injection-molded or extruded in appropriate fashion. The prior art does not even allude to means which make it possible to obtain, starting from the reaction mixtures according to the teaching of the above-mentioned '351 patent, copolyetheramides possessing a sufficiently high viscosity in the molten state to permit their use as technical-grade plastics.

SUMMARY OF THE INVENTION

Accordingly, a major object of the present invention is the provision of novel copolyetheramides of block structure which have, in particular, high melting points, substantial flexibility and elasticity down to temperatures as low as $-20°$ C. or below, and a high viscosity in the molten state.

DETAILED DESCRIPTION OF THE INVENTION

More particularly according to the present invention, the subject homogeneous copolyetheramide block copolymers have, in particular, a melting or softening point equal to at least 170° C., a glass transition temperature, measured at EHO 0% relative humidity, equal to at most $-5°$ C. and a viscosity in the molten state, measured under the conditions defined below, equal to at least 500 poises, said copolyetheramides being characterized in that they are prepared as follows:

(i) a lactam having from 4 to 12 carbon atoms is mixed with a solution of a salt of a fatty acid dimer and a polyoxyalkylenediamine in a solvent medium comprising a mixture of water and an aliphatic alcohol having fewer than 5 carbon atoms, a water/alcohol/lactam mixture (the alcohol and the lactam used both falling within the definitions given immediately above), the lactam itself being in the molten state, or alternatively, when the lactam is soluble in water, a water/lactam mixture;

(ii) the stoichiometry of the said salt having been established beforehand by measuring the pH of the solution of the salt in a diluent mixture comprising water and at least one compound selected from an aliphatic alcohol, an aliphatic diol or a lactam (the alcohol and the lactam used both falling within the definitions given above and the aliphatic diol containing from 2 to 6 carbon atoms) and by adjusting the composition of said salt such that the pH attains the value at the equivalence point, to $\pm 0.05$ pH unit, it being possible for the mixing of the solution of the salt with the lactam to be omitted if the solution of the salt in the sovlent medium comprising a water/alcohol/lactam mixture, a water/lactam mixture or the lactam itself in the molten state contains sufficient lactam to obtain the copolyetheramide of the desired composition; and (iii) a small amount of an additive is then added to the reaction mixture, said additive comprising an inorganic oxyacid or an organic oxyacid other than a carboxylic acid, at least one of the acid groups of which, when there are several, having an ionization constant pKa, in water at 25° C., which is equal to or less than 4, and the entire mass is then heated in order to effect reaction of the lactam with the salt.

The viscosity in the molten state is measured at 230° C., under a shear gradient of 10 s$^{-1}$, using a Davenport rheometer in the case of the copolyetheramides obtained from lactams having from 6 to 12 carbon atoms; in the case of the copolyetheramides obtained from lactams having 4 to 5 carbon atoms, the viscosity in the molten state is measured as indicated above, but at 260° C.

The following are illustrative of lactams which are suitable for carrying out the present invention: γ-butyrolactam, δ-amylolactam, ε-caprolactam, enantholactam, capryllactam, azacycloundecan-2-one, azacyclododecan-2-one and laurolactam. The lactam which is preferred is ε-caprolactam, in which case the reactant used possesses the same characteristics as the reactant used for the industrial manufacture of polycaprolactam or nylon 6.

The dimeric acids employed are obtained by polymerizing compounds comprising 80% to 100% by weight of monomeric fatty acid(s) having from 16 to 20 carbon atoms, and 20% to 0% by weight of monomeric fatty acid(s) having from 8 to 15 carbon atoms and/or from 21 to 24 carbon atoms. By the term "monomeric fatty acids" there are intended saturated or unsaturated, linear or branched chain aliphatic monoacids.

The following are representative of the saturated linear or branched chain monomeric fatty acids: caprylic, pelargonic, capric, lauric, myristic, palmitic and isopalmitic, stearic, arachidic, behenic and lignoceric acids.

The following are illustrative of the linear or branched chain, ethylenically unsaturated monomeric fatty acids: oct-3-enoic, dodec-11-enoic, oleic, lauroleic, myristoleic, palmitoleic, gadoleic, cetoleic, linoleic, linolenic, eicosatetraenoic and chaulmoogric acids. Certain acetylenically unsaturated acids can also provide polymeric acids, but the extent to which they exist in the natural state is not advantageous and their economic value is thus slight.

The polymeric fatty acids obtained by polymerization under the action of heat, if appropriate in the presence of catalysts such as peroxides or Lewis acids, can be fractionated, for example by conventional techniques of vacuum distillation or of solvent extraction. They can also be hydrogenated in order to reduce their degree of unsaturation and thus to reduce their coloration.

The dimeric acids which are preferably used in the present invention are fractionated polymeric fatty acids in which the fraction of difunctional acid is greater than 94% by weight, the fraction of monofunctional acid is less than 1% by weight and even more preferably equal to or less than 0.5% by weight, and the fraction of acid containing more than 2 functional groups is less than 5% by weight and even more preferably equal to or less than 3% by weight.

The dimeric acids which are even more preferably used are the species obtained by the fractionation (leading to the fractions indicated above) of polymeric fatty acids which have also been hydrogenated.

The dimeric acids which are very particularly suitable are the species obtained by fractionating a hydrogenated composition resulting from the catalytic polymerization of monomeric fatty acid(s) having 18 carbon atoms. In this context, because of their ready availability and their relative ease of polymerization, oleic, linoleic and linolenic acids, taken by themselves, in pairs or, preferably, in the form of a ternary mixture, are the starting materials which are markedly preferred for the preparation of the polymeric fatty acids.

The other reactants used in the present invention are the polyoxyalkylenediamines. These compounds can be represented by the general formula:

$$H_2N-R_1-(OR_2)_n-OR_3-NH_2 \quad (I)$$

in which the symbols $R_1$, $R_2$ and $R_3$, which are identical or different, represent linear or branched chain, saturated divalent aliphatic radicals containing from 1 to 10 carbon atoms and the symbol n is a number determined such as to give a molecular weight ranging from 100 to 10,000 and preferably ranging from 300 to 5,000.

Exemplary of suitable polyoxyalkylenediamines, representative are the compounds of the formula (I) in which:

(1) $R_1 = R_2 = R_3 =$

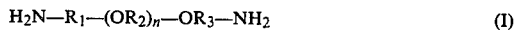

and n=5.6: polyoxypropylenediamine of molecular weight 455;

(2) $R_1 = R_2 = R_3 =$

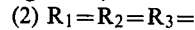

and n=33.3: polyoxypropylenediamine of molecular weight 2065;

(3) $R_1 = R_3 =$

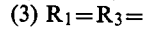

$R_2 = -CH_2-CH_2-$ and n=50.5: polyoxyethylenediamine of molecular weight 2355; and (4) $R_1 = R_3 =$

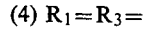

$R_2 = -CH_2-CH_2-CH_2-CH_2-$ and n=34: polyoxytetramethylenediamine of molecular weight 2585.

It is of course possible, without thereby exceeding the scope of the invention, to use a mixture of two or more than two polyoxyalkylenediamines.

The process for the preparation of the copolyetheramides according to the present invention comprises, in a first stage, preparing a solution of a salt of a fatty acid dimer and a polyoxyalkylenediamine in a suitable solvent medium, the stoichiometry of this salt being monitored and adjusted by pH measurement before introducing it into the polycondensation reaction with the lactam in the presence of the acid additive.

As mentioned above, the solvent medium for the salt in question can be a water/alcohol mixture (a), a water-/alcohol/lactam mixture (b), the molten lactam (c) or alternatively, when the lactam selected is soluble in water, a water/lactam mixture (d). The lactam which can then be employed is advantageously the same as that selected as the polycondensation reactant. As regards the water content of the solvent media (a) and (d) and the concentration of the salt in the media (a), (c) and (d), reference is made to pages 2 and 3 of French Pat. No. 2,407,227, assigned to the assignee hereof and the disclosure of which hereby expressly incorporated by reference. It will be appreciated that small variations relative to the teachings of this patent can apply to the definition of the limits between which the values of the water content of the solvent media and the values of the concentration of the salt are to be found; these small variations can be attributed to the fact that, in the present invention, the salt is first prepared from a polyoxyalkylenediamine whereas, in the noted prior art, the salt is prepared from hexamethylenediamine, and secondly, it is now possible to use a lactam other than the caprolactam referred to in said reference. However, those skilled in the art can easily determine these small variations using simple known tests. As regards the solvent medium (b), although it was not described in the '227 French patent, its composition is easily determined in the light of the disclosure thereof.

As to how to adjust the stoichiometry of the solution of the salt, reference is again made to French Pat. No. 2,407,227. As indicated on page 3 thereof, the preferred solvent mixtures used to dilute the solution of the salt temperatures as low as between −20° C. and −40° C. Their high viscosity in the molten state, measured under the conditions defined above, which ranges from 500 poises to 5000 poises and even more, also imparts to same excellent suitability for injection molding and extrusion, together with high mechanical tensile strength characterietics. It has furthermore been found that the product copolyetheramides have good resistance to water. Being perfectly homogeneous, they also have good transparency properties. A variety of applications requiring the specific qualities of these copolyetheramides are in fields as diverse as the engineering industries, building, the automotive industry and electrical household appliances.

In order to further illustrate the present invention and the advantages thereof, the following specific examples are given, it being understood that same are intended only as illustrative and in nowise limitative.

In said examples to follow, a number of checks were carried out. Likewise, various properties were measured. The procedures and/or the standards according to which these checks and measurements were carried out are indicated below:

Determination of the pH of the salt solutions:

The pH measurements were carried out at 20° C. using a Radiometer PHM 62 pH meter, calibrated in hundredths of a pH unit.

Microcalorimetric analysis:

The polymers were characterized by the melting characteristics such as the melting endotherms Em and the crystallization exotherms Ec.

These determinations were carried out on a sample subjected to both rising and falling temperature variations of 10° C./minute. A curve is thus determined by differential microcalorimetry, on which the melting point (Tm) and crystallization point on cooling (Tc) can be located.

Glass transition:

The glass transition temperature (Tg) corresponds to the sudden drop in the shear modulus as a function of temperature. It is determined on the graph representing the variations in the torsional modulus as a function of temperature, these variations being measured by thermo-mechanical analysis using an automatic torsional pendulum.

Torsional shear modulus:

This was determined at two temperatures, namely, at −20° C. and +20° C., using an automatic torsional pendulum at a frequency on the order of 1 Hertz, according to ISO Standard R 537. The test pieces were conditioned at EHO, that is to say, same were placed in a desiccator over silica gel and dried for 24 hours at ambient temperature under 0.66–1.33.10² Pa, before the measurements were carried out. The results are expressed in Mpa.

Determination of mechanical tensile characteristics:

These were determined at 25° C. on 2 mm thick H3-type test pieces conditioned at EHO, according to French Standard T 51 034 (traction speed of 10 mm/minute on an Instron-type tensile tester).

Resistance to water:

The water uptake at 25° C. was determined on 2 mm thick test pieces of the type used for the tensile tests, after immersion in water for 24 hours. The results express the variation in % relative to the initial weight.

In the examples which follow, the dimeric acid used was a compound marketed by Unichema Chemie under the trademark Pripol 1010, in which the fraction of difunctional acid was greater than 95% by weight. This fraction of difunctional acid consisted of a mixture of isomers having 36 carbon atoms, the preponderant species of which is a saturated compound of the formula:

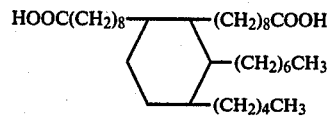

The fraction of monofunctional acid (whose proportion by weight will be specified later) consisted essentially of oleic acid; the fraction of acid containing more than 2 functional groups (whose proportion by weight will also be specified later) consisted essentially of a mixture of isomeric trimers having 54 carbon atoms; the average molecular weight of this dimeric acid was on the order of 565.

EXAMPLE 1

(1) Preparation of the salt of a polyoxypropylenediamine of molecular weight 2065 and the fatty acid dimer, in 33.33% by weight solution in a 50/50 (by weight) water/caprolactam mixture:

The following materials were charged, under stirring, into a 10 liter round-bottomed glass flask equipped with a propeller stirrer (three blades; speed of rotation: 100 rpm) and a dropping funnel and capable of operating under a nitrogen atmosphere:

(i) Softened water: 1517.5 g
(ii) Pure caprolactam: 1517.5 g
(iii) Polyoxypropylenediamine of molecular weight 2065, marketed by BASF under the trademark Etherdiamine 2000: 1178 g.

The mixture was homogenized for about one hour and the free volume in the flask was purged with nitrogen.

339.5 g of the fatty acid dimer marketed under the trademark Pripol 1010 by Unichema Chemie, in which the proportion of monomer was 0.03% and the proportion of trimer was 3%, were introduced uniformly into the stirred solution over a period of about 30 minutes. The solution was homogenized for 30 minutes.

A small sample of about 10 cm³ was taken and diluted with a water/isopropanol mixture (42.85/57.15 by weight) to adjust the concentration of the salt of the dimeric acid and the polyoxypropylenediamine to 10% by weight. The pH of this dilute solution at 20° C. was below the pH at the equivalence point.

18.6 g of a 33.33% by weight solution of the polyoxypropylenediamine in a water/caprolactam mixture (50/50 by weight) were introduced into the concentrated solution. The solution was homogenized for 30 minutes and a further pH measurement was then carried out in dilute solution containing 10% of salt, as previously. The pH of the dilute solution reached the pH at the equivalence point to plus or minus five hundredths of a pH unit.

The concentrated solution adjusted in this manner was maintained at 25° C. under a nitrogen atmosphere.

(2) Preparation of a copolyetheramide of caprolactam/dimeric acid - polyoxypropylenediamine of molecular weight 2065, having a composition by weight of about 50/50 (amide blocks/ether blocks):

The apparatus used consisted of a 7.5 liter autoclave equipped with:

with a view to carrying out the pH measurements are binary mixtures such as, for example, water/alcohol, water/diol or water/(water-soluble) lactam mixtures, but it is also possible to use ternary mixtures such as, for example, water/alcohol/lactam or water/diol/lactam mixtures, in particular in the case where the lactam selected is insoluble in water. As regards the composition of the diluent mixtures which can be used, this is the same as that indicated in the '227 patent, if appropriate with small variations affecting the definition of the limits between which the respective proportions of each constituent of these diluent mixtures are to be found, these small variations being associated, as indicated above, with the use of a different type of salt and, if appropriate, with the use of a lactam other than caprolactam, and it is of course quite easy for the skilled artisan to determine these small variations using simple known tests.

If the lactam-type reactant used is ε-caprolactam, which corresponds to a preferred embodiment of the present invention, as stated above, a solvent medium which is particularly advantageous for preparing the solution of the salt of a fatty acid dimer and a polyoxyalkylenediamine comprises water/ε-caprolactam mixtures having a water content ranging from 40 to 80% by weight; insofar as determination of the pH of the salt solution is concerned, this is very preferably carried out in water/isopropanol diluent mixtures having a water content ranging from 20 to 60% by weight.

The solution of the salt whose stoichiometry has been strictly monitored and adjusted is mixed with an appropriate amount of lactam and with a small amount of a strong acid, and the various monomers (lactam, dimeric acid and diamine with ether bridges in salt form) are then introduced.

Examples of suitable strong acids are: among the inorganic oxyacids, sulfurous, sulfuric, hypophosphorous, phosphorous, orthophosphoric or pyrophosphoric acid, and, among the organic oxyacids, organosulfonic acids, in particular methanesulfonic, paratoluenesulfonic or naphthalenesulfonic acid, or organophosphonic acids, in particular monoalkylphosphonic or monoarylphosphonic acids such as methylphosphonic or benzenephosphonic acid.

The strong acids which are preferably used are those derived from phosphorus, and more particularly hypophosphorous, phosphorous, orthophosphoric, pyrophosphoric, methylphosphonic or benzenephosphonic acid.

The proportions of strong acid, expressed as percentages by weight relative to the final copolyetheramide, advantageously range from 0.01 to 1% and preferably from 0.01 to 0.5%.

The polycondensation of the various monomers is carried out by first gradually bringing the temperature of the reaction mixture to from 130° C. to 280° C., under atmospheric pressure, and by ensuring uniform distillation of the water of polycondensation and, if necessary, of the water and, if appropriate, the alcohol forming part of the solvent medium for the salt. The polycondensation is continued by maintaining the molten reaction mass at the above-mentioned temperatures, after distillation, for a period which can vary from about 15 minutes to about 2 hours. The polycondensation is completed by subsequently creating a reduced pressure such as to gradually attain a value below $200.10^2$ Pa, and by maintaining the polycondensation medium at the above-mentioned temperatures for a period which can vary from about 15 minutes to about 2 hours; this last step under reduced pressure has the advantage of enabling a large portion of the monomers which have not undergone polycondensation to be removed.

The copolyetheramides according to the present invention can of course be modified by the addition, for example to their medium of preparation, of one or more additives such as, in particular: stabilizers and inhibitors of degradation by oxidation, by ultraviolet, by light or by heat; lubricants; colorants; nucleating agents; antifoam agents, and the like.

In the copolyetheramides according to the present invention, the crystallinity and consequently the cohesion and the possibility of obtaining high melting points and good mechanical properties under the action of heat are essentially provided by the amide blocks; by the term "amide block" there is intended the sequence of the segments of the formula (II) which are derived from the lactam used by ring opening:

$$-NH-A-CO- \quad \text{(II)}$$

with A representing the hydrocarbon chain of the lactam. The desideratum of obtaining the lowest possible Tg and consequently the desideratum of having substantial flexibility and elasticity are essentially provided by the ether blocks; by the term "ether block" there is intended the sequence of the segments of the formula (III) which are derived from the condensation of a molecule of polyoxyalkylenediamine with a molecule of dimeric acid:

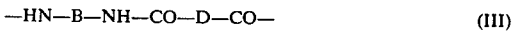
$$-HN-B-NH-CO-D-CO- \quad \text{(III)}$$

with B and D representing the organic radicals linking the functional groups of the polyoxyalkylenediamine and of the dimeric acid.

By modifying the respective proportions of the amide blocks and ether blocks in the final copolyetheramide, it is possible to vary the flexibility and elasticity of the resulting polymer over wide limits. A good compromise in terms of crystallinity, flexibility and elasticity is realized using proportions by weight of amide blocks in the final polymer ranging from 15 to 85% and preferably from 40 to 60%, and proportions by weight of ether blocks ranging from 85 to 15% and preferably from 60 to 40%. The quantities of reactants used (lactam and salt of fatty acid dimer and polyoxyalkylenediamine) are of course determined such as to provide a copolyetheramide having these proportions by weight of amide blocks and ether blocks; to calculate these proportions by weight, it is considered that the amide blocks are derived directly from the starting lactam and that the ether blocks are derived from the particular salt of dimeric acid and diamine with ether bridges, by the loss of two molecules of water.

It has been found, totally unexpectedly, that to have the good compromise mentioned immediately above and at the same time high viscosities in the molten state, it is essential to carry out the polycondensation in the presence of the acid additive previously described.

Finally, the copolyetheramides obtained have a good mechanical resistance to heat, due to their high melting points ranging from 170° C. to about 240° C. They have a Tg, measured at EHO, which can attain values below −50° C., thereby providing them with flexibility and elasticity (capable of being adjusted by varying the proportions of ether blocks) which can be maintained at (a) a system for heating by means of heat-transfer fluid,
(b) a helical band stirrer (speed: 60 rpm),
(c) a system for applying nitrogen pressure, and
(d) a circuit for condensing and collecting the volatile products.

The following materials were introduced into the autoclave preheated to 75° C.:
(i) 33.33% by weight solution of salt of the dimeric acid and the polyoxypropylenediamine of molecular weight 2065 in a 50/50 (by weight) water/caprolactam mixture, of Example 1, part (1): 4500 g;
(ii) 60% by weight aqueous solution of caprolactam: 1175 g;
(iii) antioxidant marketed under the trademark Irganox 1010 by Ciba-Geigy: 15 g;
(iv) 50% by weight aqueous solution of hypophosphorous acid: 3 g; and
(v) silicone antifoam agent: 0.5 cm$^3$.

The reaction mass was homogenized for 15 minutes and three purges were carried out with nitrogen by applying a pressure of $3.10^5$ Pa and then releasing it. The temperature of the stirred mass was gradually raised to 150° C. over about 90 minutes while at the same time ensuring uniform distillation of the water. The temperature of the reaction mass was maintained at about 150° C. until the weight of distillate reached about 1875 g.

The temperature of the reaction mass was then raised uniformly to 250° C. over 45 minutes. The temperature of the stirred mass in the autoclave was gradually raised further to 260° C. over one hour.

A pressure of $79.8.10^2$ Pa was then created gradually over about 40 minutes while at the same time maintaining the homogenized mass at 250°-260° C. The mass was homogenized for one hour under this reduced pressure at a temperature of 260°-265° C. of caprolactam were collected by distillation during the reaction phase under reduced pressure.

The stirring was terminated, a nitrogen pressure of $5.10^5$ Pa was then created in the autoclave and the polymer was drawn off. The latter, extruded from the autoclave in rod form, was cooled by passage through a bath of cold water and was then granulated and dried.

The polymer obtained was transparent and slightly opalescent.

It had the following characteristics, measured on the dry granules:
Melting point (Tm): 214° C.
Crystallization point on cooling (Tc): 156° C.
Viscosity in the molten state at 230° C. under a shear gradient $\gamma = 10$ s$^{-1}$: 2500 poises The physical and mechancial characteristics measured on conditioned injection-molded test pieces were as follows:
Water uptake at 25° C.: 4%
Glass transition temperature at EHO: −68° C.
Torsional modulus at EHO:
  at +20° C.: 90 Mpa
  at −20° C.: 170 Mpa
Mechanical tensile characteristics at EHO and at 25° C.:
  Stress at the flow threshold: 13.5 Mpa
  Elongation at the flow threshold: 16.5%
  Breaking stress: 40.2 Mpa
  Elongation at break: 580%
  Modulus of elasticity: 72 Mpa

EXAMPLE 2

(1) Preparation of a salt of a polyoxyethylenediamine of molecular weight 2355 and the fatty acid dimer, in 53.33% by weight solution in a 71.43/28.57 (by weight) water/caprolactam mixture:

The following materials were charged, under stirring, into the apparatus described in Example 1:
(i) softened water: 1531 g
(ii) pure caprolactam: 612.5 g
(iii) polyoxyethylenediamine of molecular weight 2355, marketed by Texaco under the trademark Jeffamine ED 2001: 1954 g.

The mixture was homogenized for about one hour and the free volume in the round-bottomed flask was purged with nitrogen.

496 g of the fatty acid dimer Pripol 1010 from Unichema Chemie, containing a proportion of monomer of 0.03% and a proportion of trimer of 3%, were uniformly introduced into the stirred solution over a period of about 30 minutes. The solution was homogenized for 30 minutes.

A small sample of about 10 cm$^3$ was taken and diluted with a water/isopropanol mixture (46.15/53.85 by weight) such as to adjust the concentration of the salt of the dimeric acid and the polyoxyethylenediamine to 10% by weight. The pH of this dilute solution at 20° C. was below the pH at the equivalence point.

27 g of a 53.33% by weight solution of the polyoxyethylenediamine in a 71.43/28.57 (by weight) water/caprolactam mixture were introduced into the concentrated solution (53.33%). The solution was homogenized for 30 minutes and a further pH measurement was then carried out in dilute solution containing 10% of salt, as previously. The pH of the dilute solution reached the pH at the equivalence point to plus or minus five hundredths of a pH unit.

The concentrated solution adjusted in this manner was maintained at 25° C. under a nitrogen atmosphere.

(2) Preparation of a copolyetheramide of caprolactam/dimeric acid - polyoxyethylenediamike of molecular weight 2355, having a composition by weight of about 40/60 (amide blocks/ether blocks):

The following materials were introduced into the autoclave described in Example 1, part (2), preheated to 75° C.:
(i) 53.33% by weight solution of salt of the dimeric acid and the polyoxyethylenediamine of molecular weight 2355 in a 71.43/28.57 (by weight) water/caprolactam mixture, of Example 2, part (1): 3386 g;
(ii) 60% by weight aqueous solution of caprolactam: 2412.5 g;
(iii) antioxidant Irganox 1010 from Ciba-Geigy: 19 g;
(iv) 50% by weight aqueous solution of hypophosphorous acid: 3.7 g; and
(v) silicone antifoam agent: 0.5 cm$^3$.

The reaction mass was homogenized for 15 minutes and three purges were carried out with nitrogen by applying a pressure of $3.10^5$ Pa and then releasing it. The temperature of the stirred mass was gradually raised to 150° C. over about 90 minutes while at the same time ensuring uniform distillation of the water. The temperature of the mass was maintained at about 150° C. until the weight of distillate reached about 2000 g.

The temperature of the mass was then uniformly raised to 250° C. over 45 minutes and then gradually to 260° C. over one hour.

A pressure of $66.5.10^2$ Pa was then gradually created over about 30 minutes while at the same time maintaining the homogenized mass at 250°–260° C. The reaction mass was homogenized for one hour under this reduced pressure at a temperature of 260°–265° C. 608 g of caprolactam were collected by distillation during the reaction phase under reduced pressure.

The stirring was terminated, a nitrogen pressure of $5.10^5$ Pa was then created in the autoclave and the polymer was drawn off. The latter, extruded from the autoclave in rod form, was cooled by passage through a bath of cold water and was then granulated and dried.

The polymer obtained was almost colorless and slightly opalescent.

It had the following characteristics, measured on the dry granules:

Melting point (Tm): 209° C.
Crystallization point on cooling (Tc): 166° C.
Viscosity in the molten state at 230° C. under a shear gradient $\gamma = 10$ s$^{-1}$: 2100 poises.

The physical and mechanical characteristics measured on conditioned injection-molded test pieces were as follows:

Water uptake at 25° C.: 57%
Glass transition temperature at EHO: −56° C.
Torsional modulus at EHO:
  at +20° C.: 90 Mpa
  at −20° C.: 440 Mpa.

EXAMPLE 3

(1) Preparation of the salt of a polyoxypropylenediamine of molecular weight 455 and the fatty acid dimer, in 33.33% by weight solution in a 50/50 (by weight) water/caprolactam mixture:

The following materials were charged, under stirring, into the apparatus described in Example 1, part (1):
  (i) softened water: 1600 g
  (ii) pure caprolactam: 1600 g
  (iii) polyoxypropylenediamine of molecular weight 455, marketed by BASF under the trademark Etherdiamine MG 420: 694.6 g.

The mixture was homogenized for about one hour and the free volume in the round-bottomed flask was purged with nitrogen.

905.4 g of the fatty acid dimer Pripol 1010 from Unichema Chemie, containing a proportion of monomer of 0.19% and a proportion of trimer of about 1%, were uniformly introduced into the stirred solution over a period of about 30 minutes. The solution was homogenized for 30 minutes.

A small sample of about 10 cm$^3$ was taken and diluted with a water/isopropanol mixture (42.85/57.15 by weight) such as to adjust the concentration of the salt of the dimeric acid and the polyoxypropylenediamine to 10% by weight. The pH of this dilute solution at 20° C. was below the pH at the equivalence point.

32 g of a 33.33% by weight solution of the polyoxypropylenediamine in a 50/50 (by weight) water/caprolactam mixture were introduced into the concentrated solution. The solution was homogenized for 30 minutes and a further pH measurement was then carried out in dilute solution containing 10% of salt, as previously. The pH of the dilute solution reached the pH at the equivalence point to plus or minus five hundredths of a pH unit.

The concentrated solution adjusted in this manner was maintained at 25° C. under a nitrogen atmosphere.

(2) Preparation of a copolyetheramide of caprolactam/dimeric acid - polyoxypropylenediamine of molecular weight 2065/dimer acid - polyoxypropylenediamine of molecular weight 455, having a composition by weight of about 50/25/25 (amide blocks/ether blocks of the first type/ether blocks of the second type):

The following materials were charged into the apparatus described in Example 1, part (2), preheated to 75° C.:
  (i) solution of salt as prepared in Example 1, part (1): 2220 g;
  (ii) solution of salt of Example 3, part (1): 2270 g;
  (iii) 60% by weight aqueous solution of caprolactam: 480 g;
  (iv) antioxidant Irganox 1010 from Ciba-Geigy: 15 g;
  (v) 50% by weight aqueous solution of hypophosphorous acid: 3 g; and
  (vi) silicone antifoam agent: 0.5 cm$^3$.

The reaction mass was homogenized for 15 minutes and three purges were carried out with nitrogen by applying a pressure of $3.10^5$ Pa and then releasing it. The temperature of the stirred mass was gradually raised to 150° C. over about 75 minutes while at the same time ensuring the uniform distillation of 1600 g of distillate.

The temperature of the reaction mass was then uniformly raised to about 250° C. over 45 minutes and then gradually to 260° C. over one hour.

A pressure of $53.10^2$ Pa was then gradually created over one hour while at the same time maintaining the homogenized mass at 250°–260° C. The reaction mass was homogenized for one hour under this reduced pressure at a temperature of 260°–265° C. 320 g of caprolactam were collected by distillation during the reaction phase under reduced pressure.

The stirring was terminated, a nitrogen pressure of $5.10^5$ Pa was then created in the autoclave and the polymer was drawn off. The latter, extruded from the autoclave in rod form, was cooled by passage through a bath of cold water and was then granulated and dried.

The polymer obtained was almost colorless and slightly opalescent.

It had the following characteristics, measured on the dry granules:

Melting point (Tm): 206° C.
Crystallization point on cooling (Tc): 143° C.
Viscosity in the molten state at 230° C. under a shear gradient $\gamma = 10$ s$^{-1}$: 1950 poises.

The physical and mechanical characteristics measured on conditioned injection-molded test pieces were as follows:

Water uptake at 25° C.: 3%
Glass transition temperature at EHO: −65° C.
Torsional modulus at EHO:
  at +20° C.: 95 Mpa
  at −20° C.: 300 Mpa
Mechanical tensile characteristics at EHO and at 25° C.:
  Stress at the flow threshold: 13.8 Mpa
  Elongation at the flow threshold: 33%
  Breaking stress: 48 Mpa
  Elongation at break: 640%

EXAMPLE 4

(1) Preparation of the salt of a polyoxypropylenediamine of molecular weight 455 and the fatty acid dimer, in 53.33% by weight solution in a 71.43/28.57 (by weight) water/caprolactam mixture:

The following materials were charged, under stirring, into the apparatus described in Example 1, part (1):
(i) softened water: 1503 g
(ii) pure caprolactam: 601.5 g
(iii) polyoxypropylenediamine of molecular weight 455, marketed by BASF under the trademark Etherdiamine MG 420: 1045 g.

The mixture was homogenized for about one hour and the free volume in the round-bottomed flask was purged with nitrogen.

1360 g of the fatty acid dimer Pripol 1010 from Unichema Chemie, containing a proportion of monomer of 0.065% and a proportion of trimer of 4%, were uniformly introduced into the stirred solution over a period of about 30 minutes. The solution was homogenized for 30 minutes.

A small sample of about 10 cm$^3$ was taken and diluted with a water/isopropanol mixture (46.15/53.85 by weight) such as to adjust the concentration of the salt of the dimeric acid and the polyoxypropylenediamine to 10% by weight. The pH of this dilute solution at 20° C. was below the pH at the equivalence point.

32 g of a 53.33% by weight solution of the polyoxypropylenediamine in a 71.43/28.57 (by weight) water/caprolactam mixture were introduced into the concentrated solution. The solution was homogenized for 30 minutes and a further pH measurement was then carried out in dilute solution containing 10% of salt, as previously. The pH of the dilute solution reached the pH at the equivalence point to plus or minus five hundredths of a pH unit.

The concentrated solution adjusted in this way was maintained at 25° C. under a nitrogen atmosphere.

(2) Preparation of a copolyetheramide of caprolactam/dimeric acid - polyoxypropylenediamine of molecular weight 455, having a composition by weight of about 47.5/52.5 (amide blocks/ether blocks):

The apparatus of Example 1, part (2) was used and the copolymer was prepared according to the general procedure of Example 1, part (2), using the following charges:
(i) 53.33% by weight solution of the salt of polyoxypropylenediamine of molecular weight 455 and the fatty acid dimer in a 71.43/28.57 (by weight) water/caprolactam mixture, of Example 4, part (1): 3130 g;
(ii) 60% by weight aqueous solution of caprolactam: 2340 g;
(iii) antioxidant Irganox 1010 from Ciba-Geigy: 15 g;
(iv) 50% by weight aqueous solution of hypophosphorous acid: 3 g;
(v) silicone antifoam agent: 0.5 cm$^3$.

The quantity of distillate collected during the distillation phase up to 150° C. was 1890 g.

The final polymerization phase was carried out under a reduced pressure of 53.10.$^2$ Pa. 370 g of caprolactam were removed by distillation during the phase under reduced pressure.

The polymer obtained had the following characteristics, measured on the dry granules:
Melting point (Tm): 191° C.
Crystallization point on cooling (Tc): 139.5° C.
Viscosity in the molten state at 230° C. under a shear gradient $\gamma = 10$ s$^{-1}$: 950 poises The physical and mechanical characteristics measured on conditioned injection-molded test pieces were as follows:
Glass transition temperature at EHO: −22° C.

Torsional modulus at EHO:
at +20° C.: 95 Mpa
at −20°0 C.: 620 Mpa

EXAMPLE 5

Preparation of a copolyetheramide of caprolactam/dimeric acid - polyoxypropylenediamine of molecular weight 2065, having a composition by weight of about 80/20 (amide blocks/ether blocks):

The apparatus described in Example 1, part (2) was used and the copolymer was prepared according to the general procedure of Example 1, part (2), using the following charges:
(i) 33.3% by weight solution of the salt of a polyoxypropylenediamine of molecular weight 2065 and the fatty acid dimer in a 50/50 (by weight) water/caprolactam mixture, as prepared in Example 1, part (1): 1800 g;
(ii) 60% by weight aqueous solution of caprolactam: 3730 g;
(iii) antioxidant Irganox 1010 from Ciba-Geigy: 15 g;
(iv) 50% by weight aqueous solution of hypophosphorous acid: 3 g; and
(v) silicone antifoam agent: 0.5 cm$^3$.

The quantity of distillate collected during the distillation phase up to 150° C. was about 2000 g.

The final polymerization phase was carried out under a reduced pressure of 133.10$^2$ Pa. 471 g of caprolactam were removed by distillation during the phase under reduced pressure.

The polymer obtained had the following characteristics, measured on dry granules:
Melting point (Tm): 215.5° C.
Crystallization point on cooling (Tc): 163° C.
Viscosity in the molten state at 230° C. under a shear gradient $\gamma = 10$ s$^{-1}$: 7800 poises.

The physical and mechanical characteristics measured on conditioned injection-molded test pieces were as follows:
Glass transition temperature at EHO: −68° C.
Torsional modulus at EHO:
at +20° C.: 330 Mpa
at −20° C.: 570 Mpa

EXAMPLE 6

(1) Preparation of the salt of a polyoxypropylenediamine of molecular weight 2065 and the fatty acid dimer, in 53.33% by weight solution in a 71.43/28.57 (by weight) water/caprolactam mixture:

The apparatus of Example 1, part (1) was used. The following materials were charged, under stirring, into the round-bottomed flask:
(i) softened water: 938 g
(ii) pure caprolactam: 375 g
(iii) polyoxypropylenediamine of molecular weight 2065, marketed by BASF under the trademark Etherdiamine 2000: 1170 g.

The mixture was homogenized for about one hour and the free volume in the round-bottomed flask was purged with nitrogen.

330 g of the fatty acid dimer Pripol 1010 from Unichema Chemie, containing a proportion of monomer of 0.065% and a proportion of trimer of 4%, were uniformly introduced into the stirred solution over a period of about 30 minutes. The solution was homogenized for 30 minutes.

A small sample of about 10 cm$^3$ was taken and diluted with a water/isopropanol mixture (46.15/53.85 by weight) such as to adjust the concentration of the salt of the dimeric acid and the polyoxypropylenediamine to 10% by weight. The pH of this solution was below the pH at the equivalence point.

28 g of a 53.33% by weight solution of the polyoxypropylenediamine in a 71.43/28.57 (by weight) water/caprolactam mixture were introduced into the concentrated solution. The solution was homogenized for 30 minutes and a further pH measurement was then carried out in dilute solution containing 10% of salt, as previously. The pH of the dilute solution reached the pH at the equivalence point to plus or minus five hundredths of a pH unit. The concentrated solution adjusted in this manner was maintained at 25° C. under a nitrogen atmosphere.

(2) Preparation of a copolyetheramide of caprolactam/dimeric acid - polyoxypropylenediamine of molecular weight 2065, having a composition by weight of about 20/80 (amide blocks/ether blocks):

The apparatus of Example 1, part (2) was used and the copolymer was prepared according to the general procedure of Example 1, part (2), using the following charges:

(i) 53.33% by weight solution of the salt of the polyoxypropylenediamine of molecular weight 2065 and the fatty acid dimer in a 71.43/28.57 (by weight) water/caprolactam mixture, of Example 6, part (1): 2800 g;
(ii) 60% by weight aqueous solution of caprolactam: 185 g;
(iii) antioxidant Irganox 1010 from Ciba-Geigy: 9 g;
(iv) 50% by weight aqueous solution of hypophosphorous acid: 1.8 g; and
(v) silicone antifoam agent: 0.5 cm$^3$.

The quantity of distillate collected during the distillation phase up to 150° C. was about 940 g.

The final polymerization phase was carried out under a reduced pressure of 6.65.10$^2$ Pa. 90 g of caprolactam were removed by distillation during the phase under reduced pressure.

The polymer obtained had the following characteristics, measured on dry granules:
Melting point (Tm): 186° C.
Crystallization pointon cooling (Tc): 116° C.
Viscosity in the molten state at 230° C. under a shear gradient $\gamma = 10$ s$^{-1}$: 700 poises.

The physical and mechanical characteristics measured on conditioned injection-molded test pieces were as follows:
Glass transition temperature at EHO: −68° C.
Torsional modulus at EHO:
 at +20° C.: 21 Mpa
 at −20° C.: 25 Mpa.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A homogeneous block copolyetheramide having a melting or softening point of at least 170° C., a glass transition temperature of at most −5° C. and a viscosity in the molten state of at least 500 poises, which comprises the product of copolymerization of (I) admixture of a lactam having from 4 to 12 carbon atoms with a solution of a salt of a fatty acid dimer and a polyoxyalkylenediamine in a solvent medium comprising (i) a mixture of water and an aliphatic alcohol having less than 5 carbon atoms, (ii) a water/alcohol/lactam mixture wherein the alcohol and lactam are as above defined, (iii) a lactam as above defined in molten state or (iv) a water/lactam mixture wherein the lactam is water soluble and is as above defined, the stoichiometry of said salt being adjusted such that the pH thereof is within ±0.05 pH units of its equivalence point and (II) a minor amount of an inorganic oxyacid or an organic oxyacid other than a carboxylic acid, at least one of the acid functions thereof having an ionization constant pKa, in water at 25° C., not in excess of 4.

2. The copolyetheramide as defined by claim 1, the stoichiometry of said salt having been adjusted by measuring the pH of a solution thereof in a diluent mixture comprising water and at least one aliphatic alcohol, aliphatic diol or lactam, wherein the alcohol and lactam are as above defined and the diol contains from 2 to 6 carbon atoms, and adjusting the composition of said salt in consequence of said pH measurement.

3. The copolyetheramide as defined by claim 1, the lactam comprising said admixture (I) being constituted by said solvent medium (ii), (iii) or (iv).

4. The copolyetheramide as defined by claim 1, wherein the lactam is $\epsilon$-caprolactam.

5. The copolyetheramide as defined by claim 1, wherein the dimeric acid is prepared by polymerizing and fractionating compounds comprising 80 to 100% by weight of at least one monomeric fatty acid having from 16 to 20 carbon atoms, and 20 to 0% by weight of at least one monomeric fatty acid having from 8 to 15 carbon atoms and/or from 21 to 24 carbon atoms, said dimeric acid comprising a fraction of difunctional acid which is greater than 94% by weight, a fraction of monofunctional acid which is less than 1% by weight and a fraction of acid containing more than 2 functional groups which is less than 5% by weight.

6. The copolyetheramide as defined by claim 5, wherein said dimeric acid is prepared by fractionating a hydrogenated composition resulting from the catalytic polymerization of at least one monomeric fatty acid having 18 carbon atoms.

7. The copolyetheramide as defined by claim 1, said polyoxyalkylenediamine having the general formula:

$$H_2N-R_1-(OR_2)_n-OR_3-NH_2 \qquad (I)$$

in which $R_1$, $R_2$ and $R_3$, which are identical or different, are linear or branched chain, saturated divalent aliphatic radicals containing from 1 to 10 carbon atoms and n is a number such that the molecular weight of the polymer ranges from 100 to 10,000.

8. The copolyetheramide as defined by claim 7, said polyoxyalkylenediamine comprising a polyoxypropylenediamine of the formula (I) in which:
$R_1$, $R_2$ and $R_3$ are $$-\underset{\underset{CH_3}{|}}{CH}-CH_2-,$$

a polyoxyethylenediamine of the formula (I) in which:
$R_1$ and $R_3$ are and $R_1$ and $R_3$ are

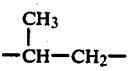

and $R_2$ is $-CH_2-CH_2$, or a polyoxytetramethylenediamine of the formula (I) in which: $R_1$ and $R_3$ are

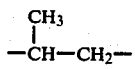

and $R_2$ is $-CH_2-CH_2-CH_2-CH_2-$.

9. The copolyetheramide as defined by claim 1, said oxyacid comprising sulfurous, sulfuric, hypophosphorous, phosphorous, orthophosphoric, pyrophosphoric, organosulfonic, methanesulfonic, paratoluenesulfonic, naphthalenesulfonic, organophosphonic, monoalkylphosphonic, monoarylphosphonic, methylphosphonic, or benzenephosphonic acid.

10. The copolyetheramide as defined by claim 9, said oxyacid comprising hypophosphorous, phosphorous, orthophosphoric, pyrophosphoric, methylphosphonic or benzenephosphonic acid.

11. The copolyetheramide as defined by claim 9, wherein the amount of oxyacid, expressed as percentage by weight relative to the product copolyetheramide, ranges from 0.01 to 1%.

12. The copolyetheramides as defined by claim 1, wherein the amount by weight of amide blocks in the product polymer ranges from 15 to 85%, and the amount by weight of ether blocks therein ranges from 85 to 15%.

* * * * *